United States Patent
Gueit et al.

(10) Patent No.: US 9,021,870 B2
(45) Date of Patent: May 5, 2015

(54) METHOD AND DEVICE FOR MONITORING A SERVOVALVE ACTUATION SYSTEM

(75) Inventors: Nicolas Marie Pierre Gueit, Montrouge (FR); Franck Godel, Chartrettes (FR); Benoit Pontallier, Paris (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/003,391

(22) PCT Filed: Feb. 24, 2012

(86) PCT No.: PCT/FR2012/050388
§ 371 (c)(1),
(2), (4) Date: Sep. 5, 2013

(87) PCT Pub. No.: WO2012/120218
PCT Pub. Date: Sep. 13, 2012

(65) Prior Publication Data
US 2014/0000352 A1    Jan. 2, 2014

(30) Foreign Application Priority Data
Mar. 7, 2011   (FR) ...................................... 11 51853

(51) Int. Cl.
| | |
|---|---|
| *G01M 15/14* | (2006.01) |
| *G05B 23/02* | (2006.01) |
| *F15B 9/09* | (2006.01) |
| *F15B 21/08* | (2006.01) |
| *F15B 19/00* | (2006.01) |
| *F16K 37/00* | (2006.01) |

(52) U.S. Cl.
CPC .............. *G01M 15/14* (2013.01); *F15B 19/005* (2013.01); *F16K 37/0083* (2013.01); *F16K 37/0041* (2013.01); *G05B 23/0235* (2013.01); *G05B 23/0283* (2013.01); *G05B 2219/42271* (2013.01); *F15B 9/09* (2013.01); *F15B 21/087* (2013.01)

(58) Field of Classification Search
CPC ............. F16K 37/0083; F16K 37/0041; F15B 19/005; F15B 21/087; F15B 9/09; G05B 23/0235; G05B 23/0283
USPC ...................................................... 73/112.01
See application file for complete search history.

(56) References Cited

U.S. PATENT DOCUMENTS

| | | | |
|---|---|---|---|
| 5,790,413 A | 8/1998 | Bartusiak et al. | |
| 7,066,189 B2 * | 6/2006 | Tranovich et al. ................ | 137/1 |

(Continued)

FOREIGN PATENT DOCUMENTS

WO          96 18110       6/1996

OTHER PUBLICATIONS

International Search Report Issued Sep. 19, 2012 in PCT/FR12/50388 Filed Feb. 24, 2012.

*Primary Examiner* — Freddie Kirkland, III
(74) *Attorney, Agent, or Firm* — Oblon, McClelland, Maier & Neustadt, L.L.P.

(57) ABSTRACT

A method for monitoring a system for actuating variable geometries of a turbojet engine, the actuation system including a control device, a servovalve, and an actuator controlled by the servovalve, the control device configured to determine a control current according to a set position value and to a measured position of the actuator and to provide the control current to the servovalve. The monitoring method includes: detecting a stabilized condition; determining an average value of the control current during the detecting the stabilized condition; and comparing the average value with a predetermined threshold.

10 Claims, 2 Drawing Sheets

(56) References Cited

U.S. PATENT DOCUMENTS

| | | | |
|---|---|---|---|
| 7,277,800 B2* | 10/2007 | Sheahan et al. | 702/34 |
| 8,271,141 B2* | 9/2012 | Cummings et al. | 700/282 |
| 8,498,750 B2* | 7/2013 | Stevens et al. | 700/282 |
| 2003/0208305 A1* | 11/2003 | Junk et al. | 700/282 |
| 2005/0000580 A1 | 1/2005 | Tranovich et al. | |
| 2007/0203656 A1 | 8/2007 | Sheahan, Jr. et al. | |
| 2009/0222220 A1* | 9/2009 | Wilke | 702/34 |
| 2009/0306830 A1 | 12/2009 | Cummings et al. | |

* cited by examiner

METHOD AND DEVICE FOR MONITORING A SERVOVALVE ACTUATION SYSTEM

BACKGROUND OF THE INVENTION

The present invention relates to the general field of servovalve actuation systems. The invention notably relates to an actuation system for an aircraft turbojet engine.

A turbojet engine typically comprises servovalve actuation systems, intended for controlling the variable geometries of the turbojet engine.

By « variable geometries » of the turbojet engine, are meant here the units of the engine or of its environment, the dimensions, shapes, positions and/or velocities of which may be modified, depending on detected events or on operating parameters of the engine. Examples of « variable geometries » are stator vanes with variable pitch of compressor rectifiers, discharge valves of the compressor, turbine vane tips and a fuel meter.

Typically, these actuation systems are monitored by the electronic control module of the engine control system or EEC (for « Electronic Engine Control » ), so as to adapt the variable geometries to the scenario of the flight. The control is ensured via feedback loops.

Thus, it is well understood that the monitoring of systems for actuating variable geometries in a turbojet engine is crucial in terms of availability and yield of the turbojet engine.

Degradation of these actuation systems are notably expressed by non-compliant positions and/or dimensions of the units of the turbojet engine with the controls of the ECU under established operating conditions, or by slow response of these units to these controls under transient conditions. These degradations are warning signs of failure since generally in a first phase they are either compensated by feedback loops of the actuation systems or without any notably consequence except for reconfiguration (for example a change in the active control channel).

However, after some time, when these degradations persist and worsen, they may no longer be compensated since the control equipment is limited. Thus, these degradations may have the consequence of making the turbojet engine inoperative or unperforming. This may be expressed by a failure message transmitted by the ECU. The detection of these deteriorations is therefore too late, since it is only achieved when the actuation system has failed.

Figure 2:
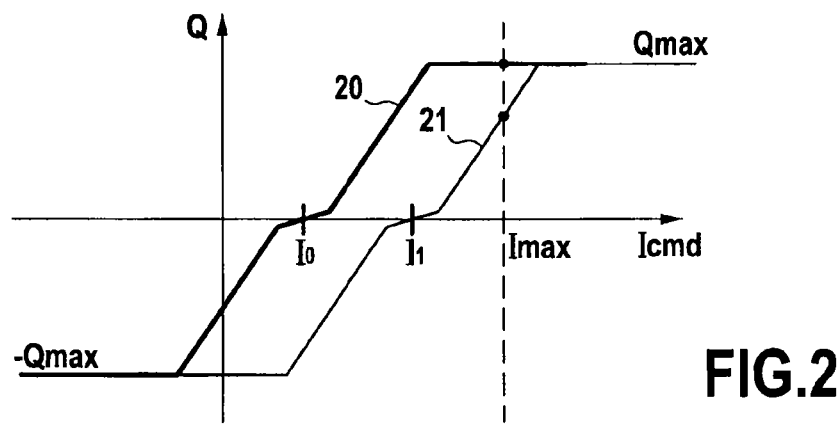

A particular degradation type is the drift of the quiescent current of the servovalve, as shown in FIG. 2.

FIG. 2 is a graph which illustrates an operating curve of a servovalve. More specifically, the graph of FIG. 2 illustrates the time dependent change in the hydraulic flow rate Q delivered by the servovalve 3 to an actuator, depending on the control current $I_{cmd}$. In FIG. 2, $I_{max}$ represents the maximum value of the control panel $I_{cmd}$ which the ECU is cable of providing.

The curve 20 corresponds to a rated condition of the servovalve and shows that the quiescent current of the servovalve, i.e. the control current required for maintaining the actuator in a determined position, has a non-zero value $I_0$. In the rated condition, the current $I_{max}$ however gives the possibility of providing the maximum hydraulic flow rate $Q_{max}$.

The curve 21 illustrates a non-rated condition of the servovalve, for example a condition after ageing. It is seen that the quiescent current has value $I_1$ greater than $I_0$. In other words, there has been a drift in the quiescent current of the servovalve. Further, in the non-rated condition of curve 21, the current $I_{max}$ no longer gives the possibility of providing the maximum hydraulic flow rate $Q_{max}$. In other words, the curve 21 corresponds to a degraded condition of the servovalve.

The detection of such a degraded condition is known. However, during the detection, the performances of the turbojet engine have already been substantially affected.

Therefore, there exists a need for having an efficient monitoring method for a system for actuation of variable geometries of a turbojet engine, notably in order to be able to deliver a maintenance notification for this actuation system before the turbojet engine is made inoperative or unperforming.

A similar need exists in other applications of a servovalve actuation system.

Document US2009/0306830 describes a method for monitoring a valve system in which a switching time of a valve element is measured between two positions. If this duration exceeds a predetermined threshold, the method determines whether this exceeding is due to the wear and tear of the system or to general conditions. The general conditions are for example represented by the control current of a solenoid valve. The control current is compared with a reference value. However, this document does not describe that the relevant control current is an average value of the control current during the detection of a stabilized condition, the stabilized condition being detected by verifying that the measured position of an actuator remains constant. On the contrary, the monitoring method described requires the switching of the valve elements between two positions.

OBJECT AND SUMMARY OF THE INVENTION

The present invention meets the aforementioned need by proposing a method for monitoring an actuation system comprising a control device, a servovalve and an actuator controlled by the servovalve, the control device being able to determine a control current according to a set position value and to a measured position of the actuator and to provide the control current to the servovalve. This monitoring method is remarkable in that it comprises:
   a step for detecting a stabilized condition,
   a step for determining an average value of the control current during the detection of the stabilized condition, and
   a step for comparing the average value with a predetermined threshold.

Correlatively, the invention is also aimed at a control device for an actuation system comprising the control device, a servovalve and an actuator controlled by the servovalve, the control device being able to determine a control current according to a set position value and to a measured position of the actuator and to provide the control current to the servovalve. This monitoring device is remarkable in that it comprises:
   means for detecting a stabilized condition,
   means for determining an average value of the control current during the detection of the stabilized condition, and
   means for comparing the average value with a predetermined threshold.

In the stabilized condition, the position of the actuator corresponds to the set position value. The control current of the servovalve therefore corresponds to the quiescent current of the servovalve. The calculation of an average value of this current gives the possibility of doing without the rapid variations and comparison with a threshold gives the possibility of testing whether the drift of the quiescent current is acceptable or not.

The monitoring method may comprise, before the determination step, a waiting step with a waiting period during which the stabilized condition is detected.

This gives the possibility of waiting for the attenuation of possible transient effects after detection of this stabilized condition.

In an embodiment, the stabilized condition is detected according to the position of the actuator.

In an embodiment, the actuation system is a system for actuating variable geometries of an aircraft turbojet engine, the stabilized condition being detected when the aircraft is on the ground.

The average value may be determined according to the control current determined by the control device.

The average value is therefore accurate since it is not influenced by the measurement accuracy of the control current.

In this case, the control device may comprise a proportional-integral controller, the average value being determined according to the integral current of the control.

According to an embodiment, the monitoring method comprises, when the average value is greater than or equal to the predetermined threshold, a step for generating a maintenance message.

In a particular embodiment, the different steps of the monitoring method are determined by instructions of computer programs.

Accordingly, the invention also aims at a computer program on an information medium, this program being able to be applied in a monitoring device or more generally in a computer, this program including instructions adapted to the application of the steps of a monitoring method as described above.

This program may use any programming language, and be in the form of source code, object code or intermediate code between source code and object code, such as in a partly compiled form, or in any other desirable form.

The invention also aims at a computer-legible information medium, and including instructions of a computer program as mentioned above.

The information medium may be any entity or device capable of storing the program. For example, the medium may include a storage means, such as a ROM, for example a CDROM or a microelectronic circuit ROM, or further a magnetic recording means, for example a diskette (floppy disc) or a hard disc.

On the other hand, the information medium may be a transmissible medium such as an electric or optical signal, which may be conveyed via an electric or optical cable, by radio or by other means. The program according to the invention may in particular be downloaded on a network of the Internet type.

Alternatively, the information medium may be an integrated circuit into which the program is incorporated, the circuit being adapted for executing the relevant method or for being used in the execution thereof.

SHORT DESCRIPTION OF THE DRAWINGS

Figure 1:
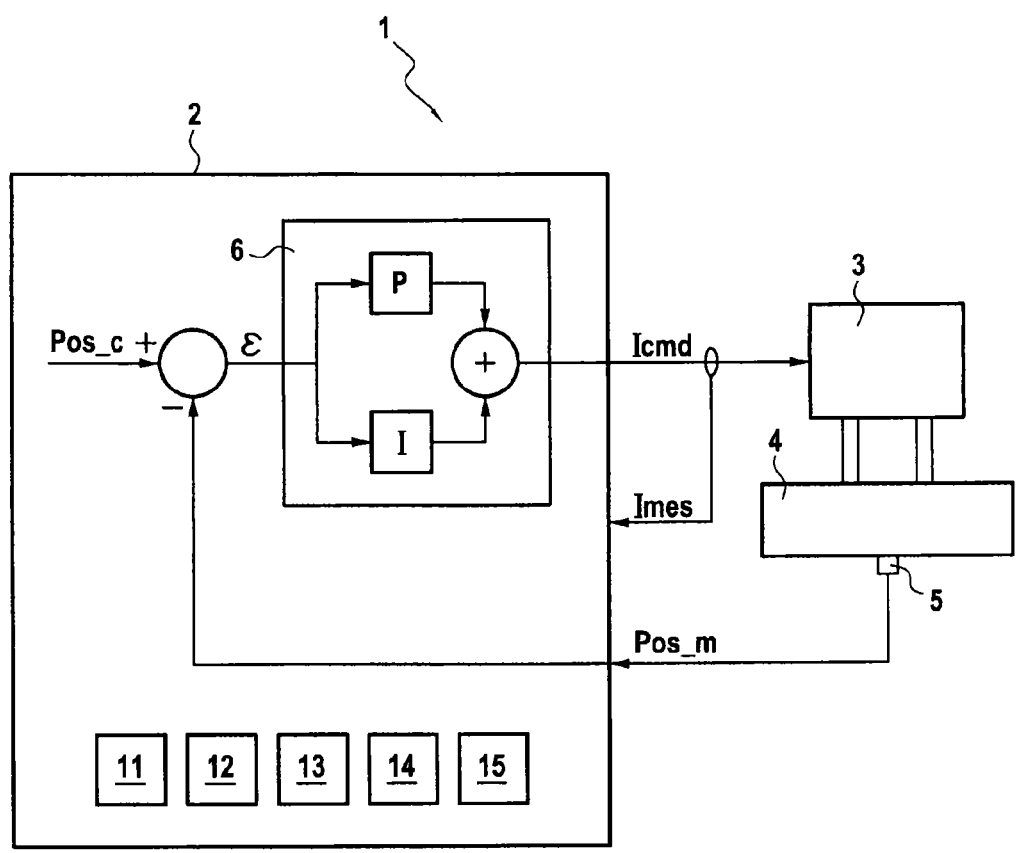
Figure 3:
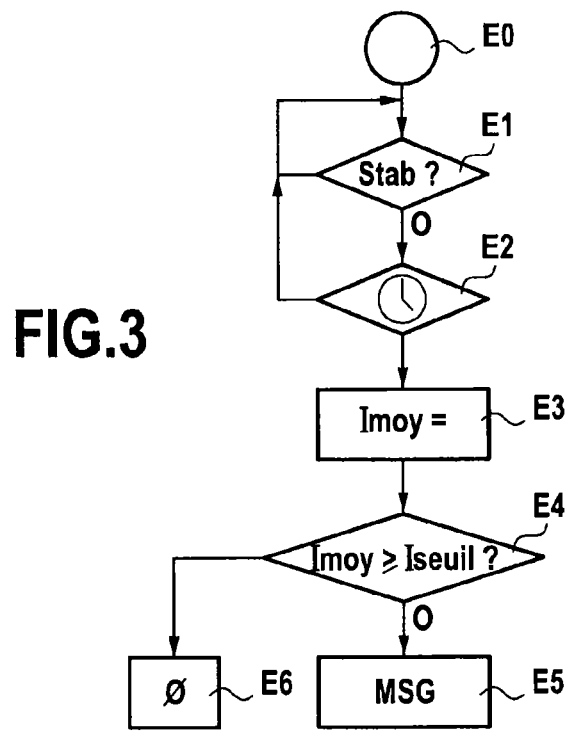

Other features and advantages of the present invention will become apparent from the description made below, with reference to the appended drawings which illustrate an exemplary embodiment thereof without any limitation. In these figures:

FIG. 1 illustrates an actuation system of a turbojet engine,
FIG. 2 is a graph which illustrates a curve of the operation of a servovalve, FIG. 3 illustrates as a flow chart, the main steps of a monitoring method according to the invention.

DETAILED DESCRIPTION OF AN EMBODIMENT

As described earlier, the invention relates to the monitoring of servo-control chains of servovalve actuation systems. In the embodiment described here, the monitoring of a servo-control chain of an actuation system controlling a variable geometry of a turbojet engine fitting out an aircraft, is contemplated. However, this assumption is by no means limiting. The invention also applies to other actuating systems with a servovalve, notably to building-site machines, industrial robots, . . .

The actuation of the variable geometry for example corresponds to the control of:

the position of a fuel meter of a turbojet engine, also known as FMV (« Fuel Metering Valve » );

positions of discharge valves of a compressor of the turbojet engine, such as VBV (Variable Bleed Valve) and TBV (Transient Bleed Valve); actuation systems;

pitch angles of stator vanes of a turbojet engine, also known as VSB (Variable Stator Vane); and plays at the vane tips of a high-pressure or low-pressure turbine, such as HPTACC (High Pressure Turbine Active Clearance Control) or LPTACC (Low Pressure Turbine Active Clearance Control) actuation systems.

FIG. 1 illustrates an actuation system 1 controlling the position of a fuel meter of a turbojet engine. The actuation system comprises a control device 2, a servovalve 3 and an actuator 4. The position of the actuator 4 influences the fuel flow rate delivered by the fuel meter (not shown).

The control device 2 may be the computer of the turbojet engine (ECU for « Engine Control Unit » ), also called a full authority control device for the aircraft (FADEC « Full Authority Digital Engine Control » ).

The actuator 4 is associated with a position sensor 5. The position of the actuator 4 is controlled by the servovalve 3, itself controlled by the control device 2. More specifically the servovalve 3 adapts the hydraulic power delivered to the actuator 4 according to an electric control current $I_{cmd}$ which it receives from the control device 2.

The position of the actuator 4 measured by the sensor 5 is noted as Pos_m and is provided to the control device 2.

The control device 2, the servovalve 3 and the actuator 4 form a feedback loop. Indeed, the control device 2 determines the difference $\epsilon$ between the position Pos_m and a set position value, noted as Pos_c. The difference $\epsilon$ is provided to a controller 6, for example of the proportional-integral type, which determines the control current $I_{cmd}$.

The control device 2 here has the hardware architecture of a computer. It notably includes a processor 11, a non-volatile memory 12, a volatile memory 13, an interface 14 and a communications module 15. With the processor 11, it is possible to execute computer programs stored in memory in the non-volatile memory 12, by using the volatile memory 13. The interface 14 gives the possibility of acquiring measurement signals, notably the position Pos_m and a measurement of the control current $I_{cmd}$, noted as $I_{mes}$, on the one hand and of transmitting control signals, notably the control current $L_{cmd}$ on the other hand.

The communications module 15 gives the possibility of exchanging data with other entities, notably maintenance equipment.

In an embodiment, the determination of the set position value Pos_c and of the difference $\epsilon$ as well as the application of the controller 6 correspond to a control program stored in memory in the non-volatile memory 12 and executed by the processor 11.

As explained in the introduction with reference to FIG. 2, the quiescent current of the servovalve 3 may drift. It is understood that between the values $I_0$ and $I_1$ of the quiescent current, respectively corresponding to a rated condition and a degraded condition, a current threshold $I_{seuil}$ is found up to which the drift of the quiescent current remains acceptable.

A monitoring method according to the invention intended to determine whether the drift of the quiescent current of the servovalve 3 is acceptable or not is now described with reference to FIG. 3. The monitoring method is applied by the control device 2, which is therefore also a monitoring device according to the invention.

The monitoring method of FIG. 3 begins in step E0 and then in step E1, it is checked whether a stabilized condition is detected.

A stabilized condition may for example be detected when the measured position Pos_m remains constant.

Other conditions may be used additionally or alternatively for detecting a stabilized condition, notably:
  The aircraft is on the ground (which is typically indicated by the value of a variable of the computer called WOW for « Weight On Wheel » ).
  The engine operating conditions N are constant, for example equal to idling conditions on the ground.

When a stabilized condition is not detected, the monitoring method loops in step E1. On the other hand, if a stabilized position is detected, the monitoring method continues in step E2.

In step E2, the method waits for a predetermined waiting period during which the stabilized condition is detected.

Step E2 is for example a loop for counting a number of real time clock cycles. If at each counted cycle, the stabilized condition is detected, the method switches to step E3 when the cycle counter reached a predetermined value. On the other hand, if the stabilized condition is no longer detected before the cycle counter has reached the predetermined value, the monitoring method returns to step E1.

Step E2 gives the possibility of waiting for the attenuation of possible transient effects due to the operation of the turbojet engine before detection of the stabilized condition in step E1.

Next, in step E3, the average value $I_{moy}$ of the control current $I_{cmd}$ is determined for a predetermined time during which the stabilized condition is detected.

The average value $I_{moy}$ represents the quiescent current of the servovalve 3. Indeed, when the stabilized condition is detected, the measured Pos_m is constant and equal to the set value Pos_c. The control current $I_{cmd}$ is therefore simply used for maintaining the position constant.

Step E3 is for example applied by a loop for counting a number of real time clock cycles. At each cycle i, the sum $S(i)=S(i-1)+I_{cmd}$ is calculated. After a predetermined number n of cycles, the sum S(n) is divided by n in order to obtain $I_{moy}$:

$$I_{moy}=S(n)/n$$

At each cycle, if the stabilized condition is no longer detected, the monitoring method is reset (step E0). On the other hand, if the stabilized condition is always detected up to the nth cycle and to the calculation of $I_{moy}$ the method then switches to step E4.

In step E4, the current $I_{avg}$ is compared with the current threshold $I_{seuil}$.

If $I_{moy}$ is less than $I_{seuil}$, this means that the drift of the quiescent current of the servovalve 3 is acceptable. The monitoring method therefore ends with step E6 without sending any maintenance message.

On the other hand, if $I_{moy}$ is greater than or equal to $I_{seuil}$, this means that the drift of the quiescent current of the servovalve 3 is no longer acceptable. The monitoring method therefore ends with step E5 during which a maintenance message is generated.

The maintenance message is for example stored in memory in the non-volatile memory 12, and then subsequently forwarded to a piece of maintenance equipment by the communications module 15.

The waiting period of step E2, the duration considered for calculating the average $I_{moy}$ and the value of the threshold $I_{seuil}$ may be selected by the designer of the monitoring method, according to the targeted application.

For example, the waiting period of step E2 and the duration considered for calculating the average $I_{moy}$ in step E3 may each be of 10 seconds.

In this case, the total duration of steps E2 and E3 during which it is necessary to detect a stabilized condition is 20 seconds. Such a duration is less than the duration during which an airplane is idle on the ground before take-off during a typical mission. It is therefore possible to detect a stabilized condition and to carry out the steps E2 and E3 at this instant.

Moreover, it is known that an engine loop typically has an eigenfrequency corresponding to a period of the order of 4 seconds. For a real time clock with a typical period of 15 ms, calculation of $I_{moy}$ over a period of 10 seconds corresponds to n=666 cycles and therefore gives the possibility of obtaining a realistic average independent of the oscillations of the engine loop. Further, the waiting period of 10 seconds is greater than the period of the engine loop and therefore gives the possibility of waiting for the attenuation of the transient effects.

The value of $I_{seuil}$ may be selected according to the rated characteristic curve of the servovalve 3, to the maximum current which the control device 2 is capable of providing, and to the accuracy of the current provided by the control device 2.

In step E3, the average $I_{moy}$ is calculated according to the control current $I_{cmd}$. More specifically, the average $I_{moy}$ is calculated according to the value of the control current $I_{cmd}$ calculated by the controller 6. In the case of a proportional-integral controller, this value is equal to the integral current of the controller when the stabilized condition is detected. Thus, the average $I_{moy}$ may be calculated according to the value of the integral current of the controller. Alternatively, the average $I_{moy}$ may be calculated according to the measured value $I_{mes}$ of the control current $I_{cmd}$. However in this case, the average $I_{moy}$ is influenced by the accuracy of the measurement.

In an embodiment, the steps of FIG. 3 correspond to a monitoring program stored in memory in the non-volatile memory 12 and executed by a processor 11.

According to another advantage of the invention, the identification of the quiescent current of the servovalve may give the possibility of not saturating the integral portion of the controller 6 of the proportional-integral type and thus limiting the drift error (during transients) on the position of the actuator controlled by the servovalve. In the case of the control of the pitch angles of a stator of a turbojet engine (VSV), this increased accuracy gives the possibility of obtaining a greater margin and therefore more robustness.

The invention claimed is:

1. A method for monitoring an actuation system including a control device, a servovalve, and an actuator controlled by the servovalve, the control device configured to determine a control current according to a set position value and to a measured position of the actuator and to provide the control current to the servovalve, the monitoring method comprising:
   detecting a stabilized condition by ensuring the measured position remains constant;
   determining an average value of the control current during the detecting the stabilized position; and
   comparing the average value with a predetermined threshold.

2. The monitoring method according to claim 1, further comprising, before the determining, waiting for a waiting period during which the stabilized condition is detected.

3. The monitoring method according to claim 1, wherein the actuation system is a system for actuating variable geometries of an aircraft turbojet engine, the stabilized condition being detected when the aircraft is on the ground.

4. The monitoring method according to claim 1, wherein the average value is determined according to the control current determined by the control device.

5. The monitoring method according to claim 4, wherein the control device comprises a proportional integral controller, the average value being determined according to an integral current of the controller.

6. The monitoring method according to claim 1, further comprising, when the average value is greater than or equal to the predetermined threshold, generating a maintenance message.

7. A non-transitory computer-readable recording medium on which is recorded a computer program comprising computer executable instructions for executing the monitoring method according to claim 1.

8. The method of claim 1, further comprising determining whether a maintenance notification for the actuating system should be generated before the turbojet engine is underperforming or inoperative.

9. A control device for an actuation system including a control device, a servovalve, and an actuator controlled by the servovalve, the control device configured to determine a control current according to a set position value and to a measured position of the actuator and to provide the control current to the servovalve, the control device comprising:
   means for detecting a stabilized condition by verifying the measured position remains constant;
   means for determining an average value of the control current during detection of the stabilized condition; and
   means for comparing the average value with a predetermined threshold.

10. The control device of claim 9, further comprising means for determining whether a maintenance notification for the actuating system should be generated before the turbojet engine is underperforming or inoperative.

* * * * *